United States Patent [19]

Huber

[11] Patent Number: 5,755,958
[45] Date of Patent: May 26, 1998

[54] DEVICE FOR REMOVING MATERIAL SCREENED OR FILTERED OUT OF A LIQUID FLOWING IN A CHANNEL

[76] Inventor: Hans Georg Huber, Zum Rachental 8, D - 92334 Berching, Germany

[21] Appl. No.: 793,167

[22] PCT Filed: Jul. 3, 1996

[86] PCT No.: PCT/EP96/02900

§ 371 Date: Feb. 4, 1997

§ 102(e) Date: Feb. 4, 1997

[87] PCT Pub. No.: WO97/02081

PCT Pub. Date: Jan. 23, 1997

[30] Foreign Application Priority Data

Jul. 4, 1995 [DE] Germany ................. 195 24 276.9

[51] Int. Cl.⁶ .................. B01D 29/62; B01D 29/64; E02B 5/08
[52] U.S. Cl. .............. 210/159; 210/162; 210/295; 210/314; 210/413
[58] Field of Search .................. 210/159, 162, 210/357, 295, 314, 407, 413

[56] References Cited

U.S. PATENT DOCUMENTS 2,910,181  10/1959  Schade.

FOREIGN PATENT DOCUMENTS

| A2226365 | 11/1974 | France. |
|---|---|---|
| 3138674 | 6/1982 | Germany. |
| 30 19 127 C2 | 2/1983 | Germany. |
| 40 06 970 A1 | 9/1991 | Germany. |
| 93 03 867 | 5/1993 | Germany. |
| 43 08 333 A1 | 9/1994 | Germany. |
| 47-17703 | 5/1972 | Japan. |
| WO91/13672 | 9/1991 | WIPO. |

Primary Examiner—Thomas M. Lithgow
Attorney, Agent, or Firm—Thomas, Kayden, Horstemeyer & Risley

[57] ABSTRACT

A device for removing material screened or filtered out of a liquid flowing in a channel (3), especially in waste water treatment plants, is described. The device comprises an unpowered cylindrical grating surface (8) being immersed partly in the liquid and being formed by a plurality of substantially semicircular grating bars (10) located with distance to each other. The device further comprises a removing beam (12) rotatably driven about the axis (2) of the grating surface (8) and having removing elements (15) extending between the grating bars (10) from the inside of the cylinder to the outside. A conveying device (17) for the material is provided which is positioned with respect to the grating surface (8) and leads to a point outside the liquid in the channel (3), the device having a tube-like housing (22) with an opening (23) for the entry of the material and a driven screw (20) inside the housing (22). The unpowered at least about semicircular formed grating bars (10) of the grating surface (8) are positioned with their convex surfaces facing the flow direction (5) of the liquid in the channel (3) so that the material is deposited on the outside of the grating surface (8). The removing elements (15) on the removing beam (12) extend from the inside of the cylinder to the outside between the grating bars (10) in the direction opposite to the flow of the liquid according arrows (29) through the slots (11) between the grating bars (10).

10 Claims, 9 Drawing Sheets

DEVICE FOR REMOVING MATERIAL SCREENED OR FILTERED OUT OF A LIQUID FLOWING IN A CHANNEL

FIELD OF THE INVENTION

The invention relates to a device for removing material screened or filtered out of a liquid flowing in a channel, especially in waste water treatment plants. Although the device is especially intended for water treatment plants, it can also be employed in a practical way in other fields of technology, in the textile and plastic industries, in slaughterhouses, in poultry farms, in tanneries, etc., for example, in order to remove material, i.e. sieve or raking material, out of the liquid.

BACKGROUND OF THE INVENTION

A device of the type mentioned above is known from DE 40 06 970 A1. The semicircular grating bars of the grating surface are fixed to each other, fixly mounted and form a grating surface with its inner concave surface. The grating bars extend only partly about the lower part of the circumference. The part of the cylinder which is not covered by the grating bars is closed by a covering in form of a semicylindrical wall or sheet steel. The front side of the cylinder id designed open to make the entry of the liquid including the material possible. The liquid flows through the grating surface from the inside to the outside of the cylinder so that the material is deposited on the inside, i.e. on the concave side of the grating bars. A removing beam having removing elements is rotatably driven around the axis of the cylinder. The removing elements of the removing beam extend in a comb-like fashion into the slots between the grating bars from the inside to the outside and gathers the material during revolution. A conveying device is arranged outside the cylinder of the grating surface, the conveying device comprising a tube-like housing, a shaft and a screw on the shaft. The conveying device has an opening for the material to enter. The tubelike housing is designed closed with the exception of the inlet and outlet. A space is provided between the coverings in sheet steel form and the beginning of the semicircular grating bars. The space serves for the transition of the material from the grating surface to the conveying device. In the region of transition of the material a comb-like stripper is arranged. Changing the direction of revolution of the removing beam a stripping effect occurs loosening the material from the removing elements of the removing beam so that the material falls into the opening of the conveying device. It is not evident where the liquid level of the oncoming liquid is positioned. Due to the fact that the entry of the liquid only is possible through the front surface of the cylinder and a part of the grating surface as large as possible should be used for depositing of the material on the grating surface the liquid level should be arranged in an adapted height. However, in this case, at least a large part of the opening of the conveying device is positioned below the liquid level so that the material loosened can fall only from the comb-like stripper into the liquid. Since the housing of the conveying device is designed in closed manner the flow of the liquid can only happen in the region of the grating surface so that the danger results that the material loosened from the comb-like stripper falls down into the liquid again and again without being removed out of the channel. Thus, a concentration of material results on the grating surface. If, however, the liquid level is chosen much lower the opening of the conveying device is prepared to take over material, but in this case the effective area of the grating surface is substantially reduced and the effectivity is decreased. The disadvantages described depend on the height of the liquid level. It is a further disadvantage that the removing beam and the removing elements cooperate with the inner circumference of the semicircular grating bars. The removing beam is positioned facing the concave side of the grating surface, i.e. in a place in the liquid, in which the liquid contains the material. From this the danger results that the material will deposit on the removing beam generating stricks of the material. It is a substantial disadvantage that the removing elements of the removing beam penetrate the grating surface in the direction of the flow of the liquid through the grating surface. Thus, a substantial part of the material is pressed through the slots between the grating bars, this part of the material remaining in the liquid so that the cleaning effect of this device is limited.

Another device for removing material out of a liquid flowing in a channel is known from DE 30 19 127 C2. Here also grating bars fixly connected to each other are used to form a grating surface, the grating bars extending over a circumference of about 270° of the cylinder. Here also the liquid flows through the slots between the grating bars from the inside to the outside, i.e. the concave side of the grating bars is facing the oncoming liquid in the channel. The liquid enters the interior of the cylinder via the open front side. A removing beam having removing elements cooperates with the grating bars. The drive of a conveying device is used to drive the removing beam. The conveying device having a housing, a shaft and a screw is positioned coaxially with respect to the axis of the cylinder. Again, the opening in the housing of the conveying device is located below the liquid level and partly even apart from the falling zone of the material so that the danger results that the material is deposited on the grating surface and falls back into the liquid and is again deposited on the grating surface and so on instead of being guided into the conveying device. Here also the effect of pressing parts of the material through the slots between the grating bars occurs. This part of the material remains in the liquid and is not removed.

It is the object of the invention to improve a device of the type initially described which can be used in channels of different depth and with differing liquid levels and which allows a proper removing of material independent from different conditions.

According to the invention this is achieved with a device of the type mentioned above, wherein the unpowered at least about semicircular formed grating bars of the grating surface are positioned with their convex surfaces facing the flow direction of the liquid in the channel so that the material is deposited on the outside of the grating surface, the removing elements on the removing beam extend from the inside of the cylinder to the outside between the grating bars in the direction opposite to the flow of the liquid according arrows through the slots between the grating bars, the part of the cylinder not covered by the semicircular grating bars is designed open, and the conveying device is positioned with its axis slanting downwardly to the bottom of the channel.

The invention starts with the idea to let the liquid flow through the semicircular grating bars from the outside to the inside of the cylinder. The material is deposited on the convex surface of the grating bars. The front surfaces of the cylinder are closed so that the liquid can enter the interior of the device only by a passage through the slots between the grating bars from the convex outer surface to the concave inner surface. The semicircular grating bars are positioned with the convex surface facing the oncoming liquid in the channel, while in the prior art the concave surface is facing the oncoming liquid flow. By this change the advantage results that there is no longer a dependency on the principle limits of the devices known in the prior art, i.e. the grating surface can be used in an optimal way independent from the changing liquid levels. The slanting downward positioning at least of the conveying device can be varied and adapted to the special conditions. The device does not need much room in the channel. It is especially advantageous to position the grating surface with its axis vertically in the channel so that a very short length of the device in the channel results. A further substantial advantage is the possibility of standardizing. It is possible simply to add or to remove grating bars and elements of the removing beam in order to adapt the device to the conditions of the application. Thus, it is possible to mount the device from single elements in foreign countries far away from the production plant.

The grating bars of about semicircular form extend over half the circumference of the cylinder, i.e. over 180°, and have prolongations at both ends. Each of the grating bars has the shape of a walking stick, wherein the prolongations may have different length. The prolongation facing the conveying device is designed longer than the prolongation on the other side. The axles or bars to take up and hold the grating bars with intermediate distance pieces are located in the area of the prolongations. Thus, The axles and the distance pieces do not prevent rotating of the removing beam with the removing elements. On the other hand this kind of bearing of the grating bars is sufficient to hold the grating bars in the predetermined distance to each other in the semicircular part. The removing elements enter the slots between adjacent grating bars in the vicinity of an axle or bar so that this is a place where the distance is fixly adjusted by the height of the distance pieces. During revolution the removing elements can have contact with the semicircular grating bars which are elastically held in their mutual relationship. This is not disadvantageous because wear makes production tolerances to disappear in a self-correcting manner. At the line in which the free ends of the removing elements are withdrawn from the convex surface of the grating bars a transfer of the material from the removing elements to the grating bars occur without the need of a special loosening element. The flow of the liquid is used at this line to convey and guide the material into the conveying device.

The transition line of the material from the removing elements to the conveying device is located below the liquid level. This is a substantial advantage and offers the possibility to use the flow of the liquid as a loosening element and a transport vehicle for the material. For this purposes the housing of the conveying device has to be designed with holes distributed over the axial length of the opening in the housing. Thus, the liquid flows not only through the grating surface but also through the housing of the conveying device in order to favour the transfer of the material from the end of the grating surface into the interior of the conveying device and to prevent a second depositing of the material on the grating surface. The flow of the liquid is used advantageously. The material is concentrated in front of the opening of the housing of the conveying device. This concentrated material is taken by the screw under the liquid level and guided upwardly over the liquid level. Parts of the liquid flow back in the channel through holes in the housing of the conveying device.

A further substantial advantage of the invention is the fact, that the shaft of the removing beam and the removing elements work on the clean side of the liquid. This prevents a depositing of material on the removing beam and the removing elements. At the same time an effect of pressing parts of the material through the slots between the grating bars is avoided, because the removing elements act through the grating surface in a direction opposite to the direction of flow of the liquid. The removing elements penetrate through the slots from the inside to the outside of the cylinder and extend over the outer surface of the grating bars in order to make the gripping and gathering of the deposited material possible. Swimming material is not pressed through the grating surface but deposited on the convex side of the grating surface.

The conveying device has a substantial washing effect for the gathered material in moved below the liquid level and guided to that part of the housing of the conveying device having holes.

The invention offers the advantage of standardization of the two units of the device, i.e. a conveying device having a predetermined diameter can be used in conjunction with depositing units having different diameters of the cylinder and the grating bars. The conveying device is a separate construction element which has to be located with respect to the depositing unit only as far as local arrangement is concerned. It is not necessary to connect the two units with each other. The new device can be used for different applications, for example also if it is the liquid which has to be cleaned. The device can be used in very deep channel having only a normal width.

A connection wall may be provided between the semicircular grating bars and the opening of the housing of the conveying device. The cylindrical grating surface with the axis and the conveying device with the axis are designed to be positioned in different angles with respect to the channel. The connection wall may extend below the conveying device. The connection wall may be designed closed, for example by a sheet steel. However, the connection wall may consist of the walking-stick-like prolongations on the semicircular grating bars and thus constructed open. In all cases the connection wall is a plane area arranged tangentially to both, the grating bars and the housing of the conveying device. Thus, the advantage results to position the grating surface independent from the positioning of the conveying device in the channel and to combine these both units. It is especially advantageous to position the grating unit with its axis vertically and the conveying device with its axis slanting downwardly.

The housing of the conveying device may be provided with holes distributed over the axial length of the opening. This favours the entry of the material gathered by the removing elements into the opening of the conveying device.

The semicircular grating bars of the grating surface with the use of distance pieces may be mounted and held replaceably in spaced relationship on axles. This gives the simple possibility of standardization. The adaptation may be performed at the place where the device shall be used. On the other hand the elements of the grating surface can be produced in series and at low costs. The use of distance pieces, especially in form of disks, gives the simple possibility to generate slots of different width using the same grating bars. The only need is to have distance pieces of different height. This can be done from device to device, but also inside a single device, to have the grating surface divided in parts having different width of the slots. It is useful to have a smaller width of the slots in the lower region of the grating surface, while in the upper region of the surface an emergency part can be provided having a larger width of the slots. The liquid with low liquid level is cleaned carefully. Larger amounts of liquid with higher liquid levels may pass the device quicker due to the reduced hydraulic drag in the upper region having the larger width in the slots. Even an emergency overflow can be arranged.

The housing of the conveying device may be designed in form of a sieve or a slitted wall extending at least over the axial length of the opening in the housing. Designing the holes in the lower part of the housing of the conveying device it is important to make the sum of the free areas sufficiently large to prevent pressing the flow into the direction of the grating surface. It is the desired flow of the liquid in the vicinity of the conveying device which is used to direct the gathered material into the conveying device instead into the grating surface of the grating unit.

The connection wall may have a closed plane surface and may be positioned in the channel parallel to the flow direction. The connection wall may support the grating surface also.

The removing beam with its removing elements may be composed from elements which can simply be replaced or completed. Thus, it is possible to adapt the removing beam and the removing elements to another axial length of the grating surface.

It is possible to combine two grating surfaces with their removing beams driven in opposite direction with one common conveying device. It is evident that the opening in the housing of the conveying device has to be designed symmetrically with respect to a vertical plane in the middle of the channel in order to accept material from both of the grating units. In this way the device can be adapted to different width of the channels.

The conveying device may comprise a pressing zone for the material, the pressing zone being arranged upstream to a chute. In this area the housing has also holes through which liquid pressed from the material in the pressing zone can flow back into the channel. In the pressing zone a stopper is generated from the compressed material. The material will fall down through a chute into a container or the like.

The removing beam on the one hand and the conveying device on the other hand both may be equipped with separate drives. Thus separate unit are created which have to be mounted in local relationship only in the channel. It is not necessary to connect the individual drives. It is useful to control the drives separately. The circumferential speed of the removing elements can be chosen slower than the flowing speed of the liquid in the channel in order to make the loosening effect by the flow of the liquid more effective. Furthermore the times of revolutions and the times of standstill can be controlled separately and in different manner.

The front surfaces of the cylinder-like grating surface are closed so that the liquid can enter the grating unit only through the grating surface. Positioning the grating surface with its axis vertically the front surface is closed by the bottom of the channel. Positioning the grating surface in a slanting downward manner a step in the bottom is necessary or something similar to close the front surface.

BRIEF DESCRIPTION OF THE DRAWINGS

Preferred embodiments of the invention are illustrated and described with respect to the annexed drawings, which show in FIG. 1 a side view of a first embodiment of the device, FIG. 2 a cross section through the device along the line II—II in FIG. 1, FIG. 3 a side view of a second embodiment of the device, FIG. 4 a top view to the device of FIG. 3, FIG. 5 a cross section through the device along the line V—V in FIG. 3, FIG. 6 a side view of a third embodiment of the device, FIG. 7 a top view to the device of FIG. 6, FIG. 8 a side view of a fourth embodiment of the device, and FIG. 9 a side view of a further embodiment of the device.

DETAILED DESCRIPTION

Figure 1:
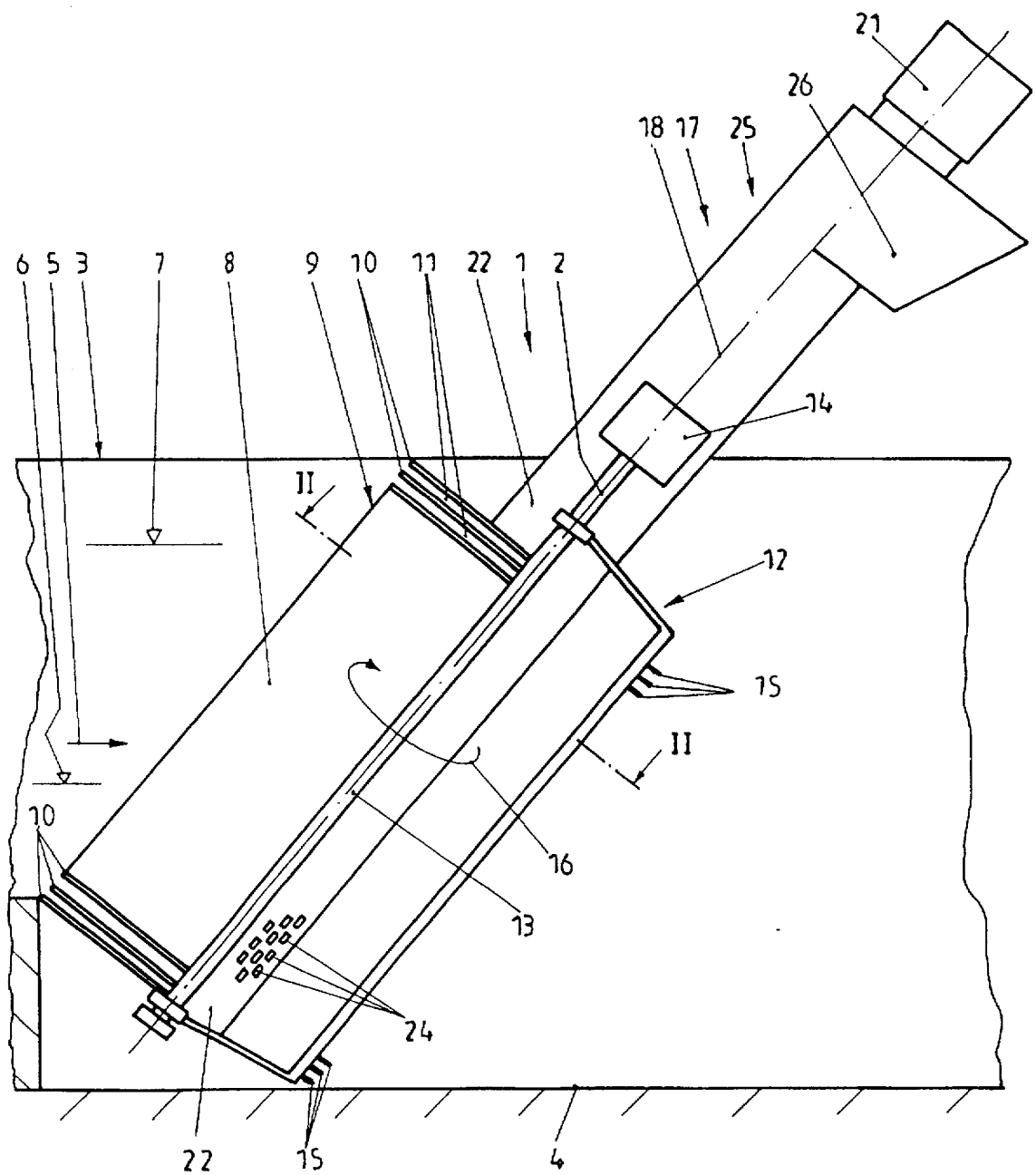

A schematically shown side view of the device 1 with its essential elements is illustrated in FIG. 1. The device 1 is positioned with its axis 2 slanting in the channel 3, of which only the bottom 4 and a side wall are shown. A liquid containing material to be screened of filtered flows in the channel 3 in flow direction 5. The liquid level in the channel can vary between limits. The drawing shows a comparatively low liquid level 6 and a comparatively high liquid level 7. But the liquid level may be even higher or lower, for it depends upon rain showers for example.

The device 1 comprises a grating surface 8 formed by a plurality of grating bars 10 extending half the circumference of a surface 9 of a cylinder. The grating bars 10 are illustrated schematically only. The grating bars 10 are positioned along the height or the length respectively of the surface 9 of the cylinder. The grating bars 10 are mounted with distance to each other so that slots 11 are formed between adjacent grating bars 10 for the passage of liquid. The liquid flows through the surface 9 of the cylinder from the outside to the inside due to the relative positioning of the semicircular grating bars 10 being positioned with their convex side in opposite direction to the flow direction 5. Thus, the grating surface 8 is provided on the outside of the surface 9 of the cylinder. The material contained in the liquid and to be removed will deposit on the outside of the grating surface 8 of the cylinder, while the liquid cleaned from the material will flow through the slots 11. The grating surface 8 formed by the half-cylindrical surface 9 of the cylinder is positioned with respect to a step in the bottom 4 of the channel 3, to direct the liquid to flow through the slots 11. It is clear that the bottom side of the half-cylindrical surface 9 and the connections of it to the side walls of the channel 3 are closed. These details are not shown for clarity.

A removing beam 12 in shape of a shackle is fixly connected with a shaft 13, the axis of which is positioned in the axis 2 of the device 1 and thus in the axis of the cylinder. The shaft 13 is supported in bearings (not shown for clarity). The shaft 13 extends over the liquid level and is driven by a schematically illustrated motor 14. The removing beam 12 is provided with removing elements 15 arranged with respect to the location of the slots 11 between the grating bars 10. The removing elements 15 during rotation extend through the slots 11 between the grating bars 10 in a comb-like fashion from the inside of the cylinder to the outside. The removing elements 15 extend over the outside of the grating bars 8 in an extend to be sure to gather on the one hand all the material deposited of the outside of the grating bars 10 during one revolution of the shaft 13 and the removing beam 12 and to deplace and convey on the other hand this gathered material in the direction to the side according to the direction 16 of revolution of the removing beam 12. The conveying motion often occurs substantially below the liquid level 6 or 7 in the lower part of the semicylindrical surface, while in the upper part it happens that the gathered and conveyed material will be raised higher than the liquid level. But at the end of its semicircular conveying way this material will be pressed under the liquid level again.

Displaced to the side (FIGS. 1 and 2) of the device 1 containing the grating surface 8 a separate conveying device 17 is provided which is positioned with its axis 18 slanting in the channel 3 also. The conveying device 17 is not connected with the device 1 neither with respect to a drive nor with respect to the elements of construction. The device 1 and the conveying device 17 may be completely separate units, only positioned with respect to each other in the channel 3. The conveying device 17 comprises a shaft 19 (FIG. 2) equipped with a screw 20. A motor 21 connected to the top end of the shaft 19 serves to drive the shaft 19 of the conveying device 17. A reduction gear may be provided between the motor 21 and the shaft 19. A further substantial element of the conveying device 17 is a tube-like housing 22 which is closed on the circumference of most of the length of the conveying device 17. Only in the lower part with respect to the axial length of the grating surface 8 or the semicylindrical surface respectively the housing 22 is designed with an opening 23 to pick up the material conveyed by the removing elements 15 from the device 1. On the opposite side, downstream in the channel 3, the housing 22 has holes, slits or the like 24 for the liquid to pass. The holes, slits or the like 24 are located over the axial length or height. In the upper region of the conveying device 17 or the housing 22 a pressing zone 25 is arranged and located prior to a chute 26. In the pressing zone 25 the screw 20 is removed from the shaft 19 so that the shaft 19 extends up to the motor 21. The material screened, deposited, gathered, conveyed, and compressed is ejected through the chute 26 into a receptacle, a container, or into another conveying means. In the area of the pressing zone 25 the housing 22 may be provided with holes 27 (FIG. 3), through which liquid from the compressed material will flow back into the channel 3. The holes 24 and 27 may have the same size and shape or a different form adapted to the purposes.

Figure 2:
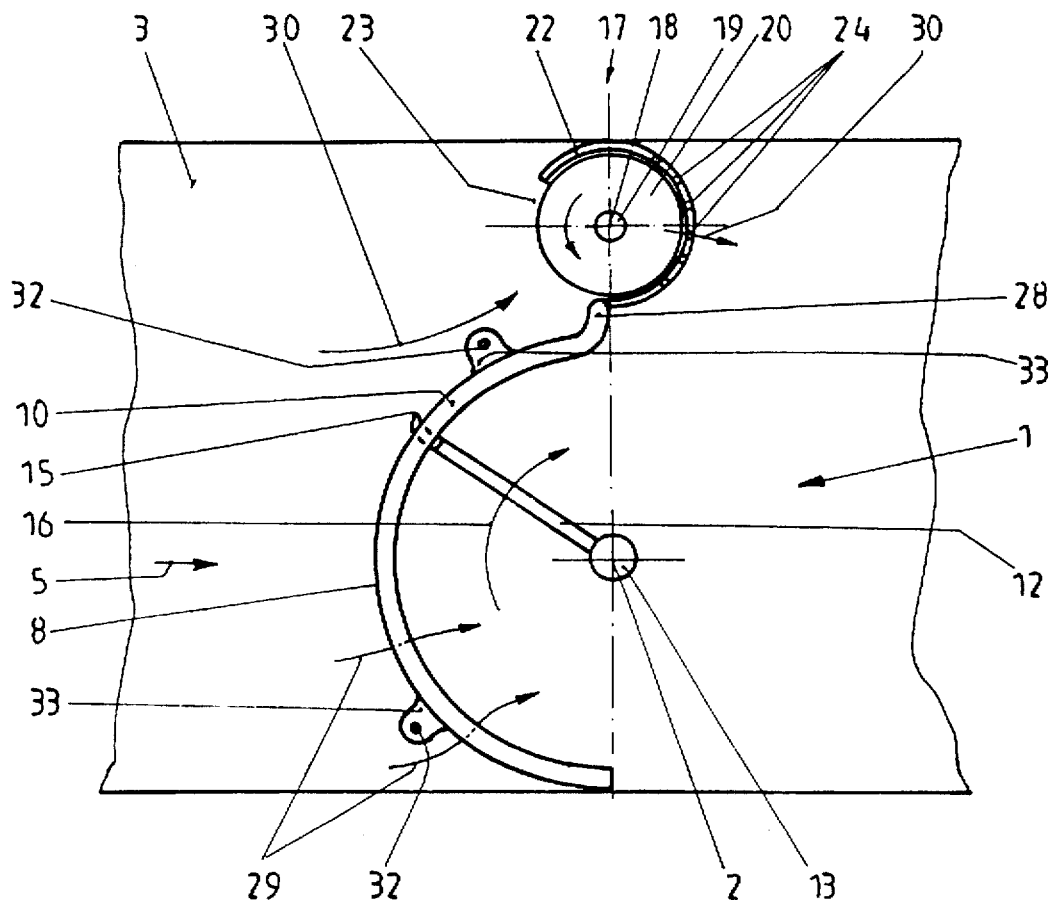

As best seen from FIG. 2 the semicircular grating bars 10 with their one ends are in contact to the side wall of the channel 3. On their other ends the grating bars 10 may have extensions 28 forming a delivery line for the material deposited on the grating surface 8, and gathered and conveyed by the removing elements 15. The housing 22 of the conveying device 17 is positioned in a manner to contact the extensions 28 with its opening 23 according to the relative position illustrated in FIG. 2. The extensions 28 substantially are directed radially with respect to the axis 2 and in the flow direction 5 of the liquid in the channel 3. The liquid penetrates the slots 11 between the grating bars 10 in the direction of arrows 29. Due to the positioning of the openings 24 in the housing 22 of the conveying device 17 part of the liquid flow in the direction of arrow 30 (FIG. 2). This flow direction is used to have a conveying motion transferred from the flowing liquid in the direction of arrow 30 to the material conveyed by the removing elements 15 and on delivery line of the extensions 28 and further into the interior of the housing 22 of the conveying device 17. The free ends of the removing elements 15 extend only with distance to the free ends of the extensions 28. The transport of the material from the removing elements 15 to the extensions 28 results from the shaping of these mechanical elements and the flow of the liquid in the direction of arrow 30. This happens below the liquid level, i.e. at a place where the liquid can show a transporting effect. Thus, the flow of the liquid in the direction of arrow 30 is advantageously used to convey the material into the conveying device 17 and in the area of the screw 20 on the shaft 19, the material passing the opening 23 of the housing 22. The flow of the liquid in the direction of arrow 30 circulates the material and thus a washing effect occurs being increased by the motion of the screw 20 in the housing 22. In this manner organic parts are removed from the material so that these organic parts remain in the liquid, while the material removed by the conveying device 17 is cleaned by the washing effect.

Figure 3:
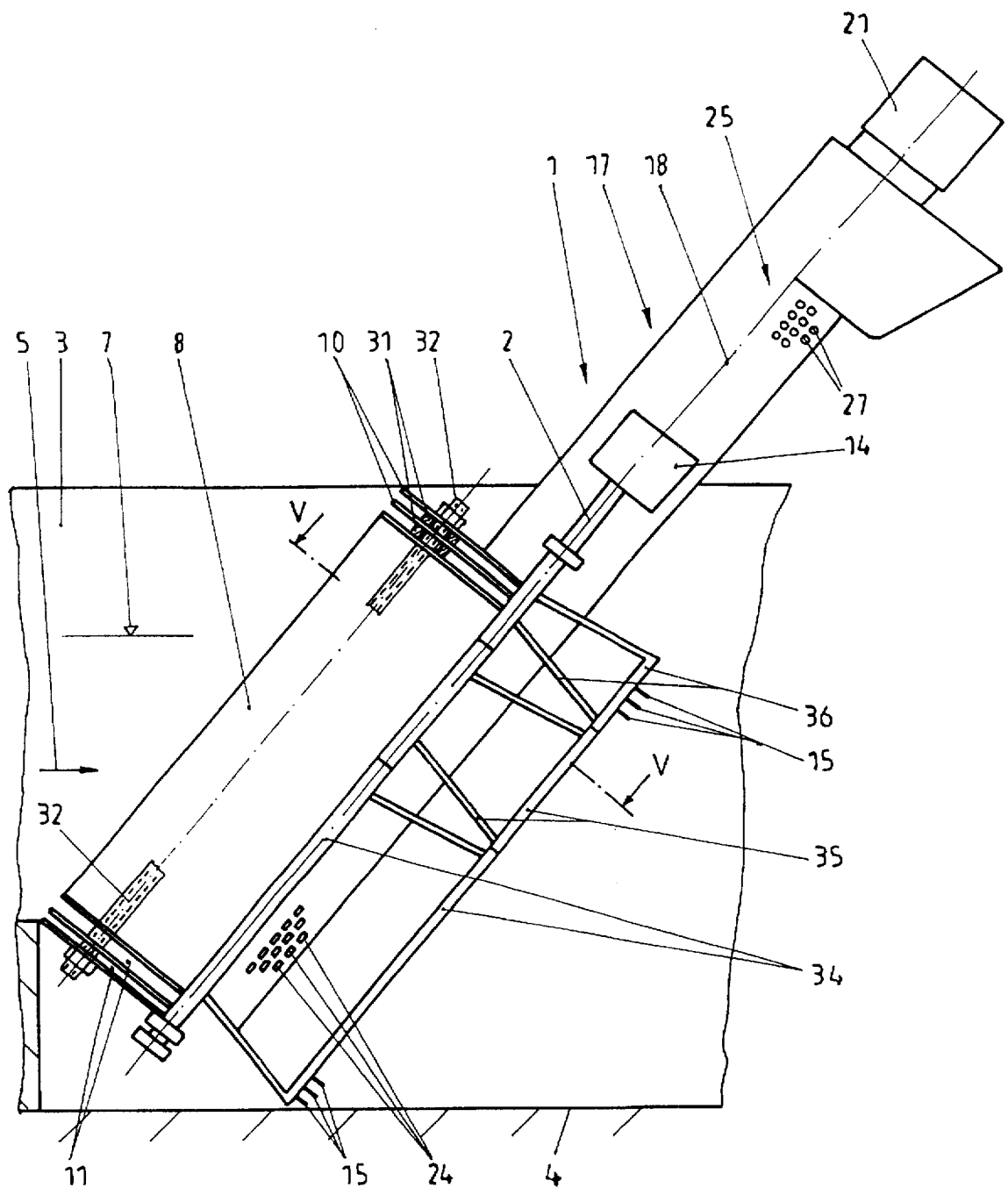

As illustrated in FIGS. 2 and 3 the grating bars 10 may be positioned on axles 32 with the help of distance pieces 31, the height of the distance pieces 31 determining the width of the slots 11. The axles 32 and the distance pieces 32 are located outside the revolving way of the free ends of the removing elements 15. The grating bars 10 may have earlike prolongations 33 formed in a manner to avoid deposit of the material in the liquid. The distance pieces 31 simply may have the form of a disk. It is possible to use distance pieces 31 of different height for different examples of application to mount devices for different purposes.

This is not only directed as far as different devices are concerned, but also with respect to a grating surface one device. It is useful to position distance pieces 31 having a smaller width in the lower part of the grating surface and distance pieces 31 having a greater width in the upper part of the grating surface in order to have a different screening effect for the time of low liquid levels 6 compared with times of high liquid levels 7, which may occur during heavy rains. In general, this system of construction kit offers the possibility to simply vary the axial length of the grating surface 8, to adapt the device to different conditions, or to replace single grating bars 10 if necessary. In the same manner as the grating surface 8 is composed from single elements 10, 31, 32, also the removing beam 12 is divided into single elements 34, 35, and 36, as illustrated in the embodiment of FIG. 3. Thus, the possibility results simply to vary and adapt the axial length of the removing beam 12 within this construction kit. The individual axial length of the elements 34, 35 and 36 may be designed with respect to modular dimensions.

Figure 4:
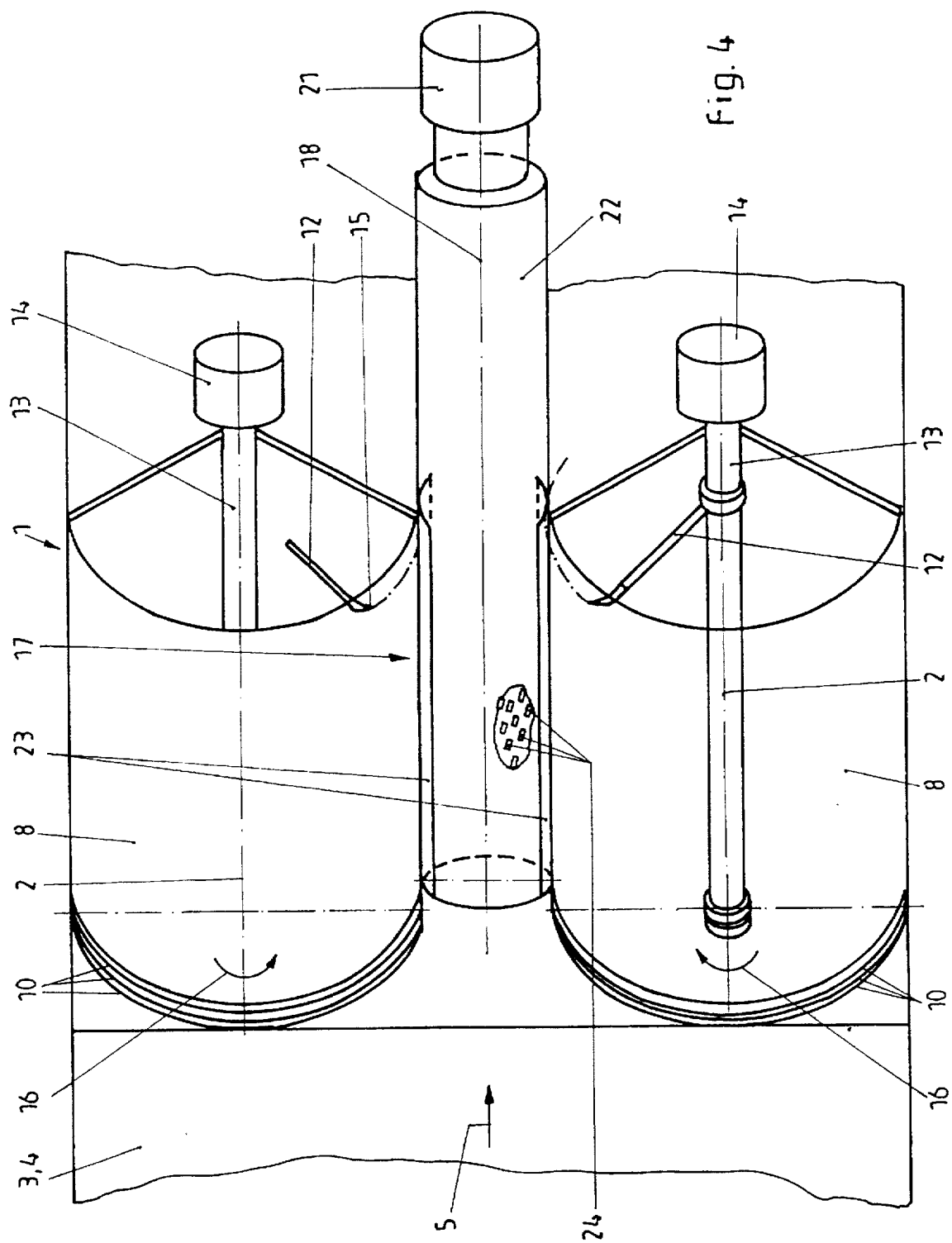
Figure 5:
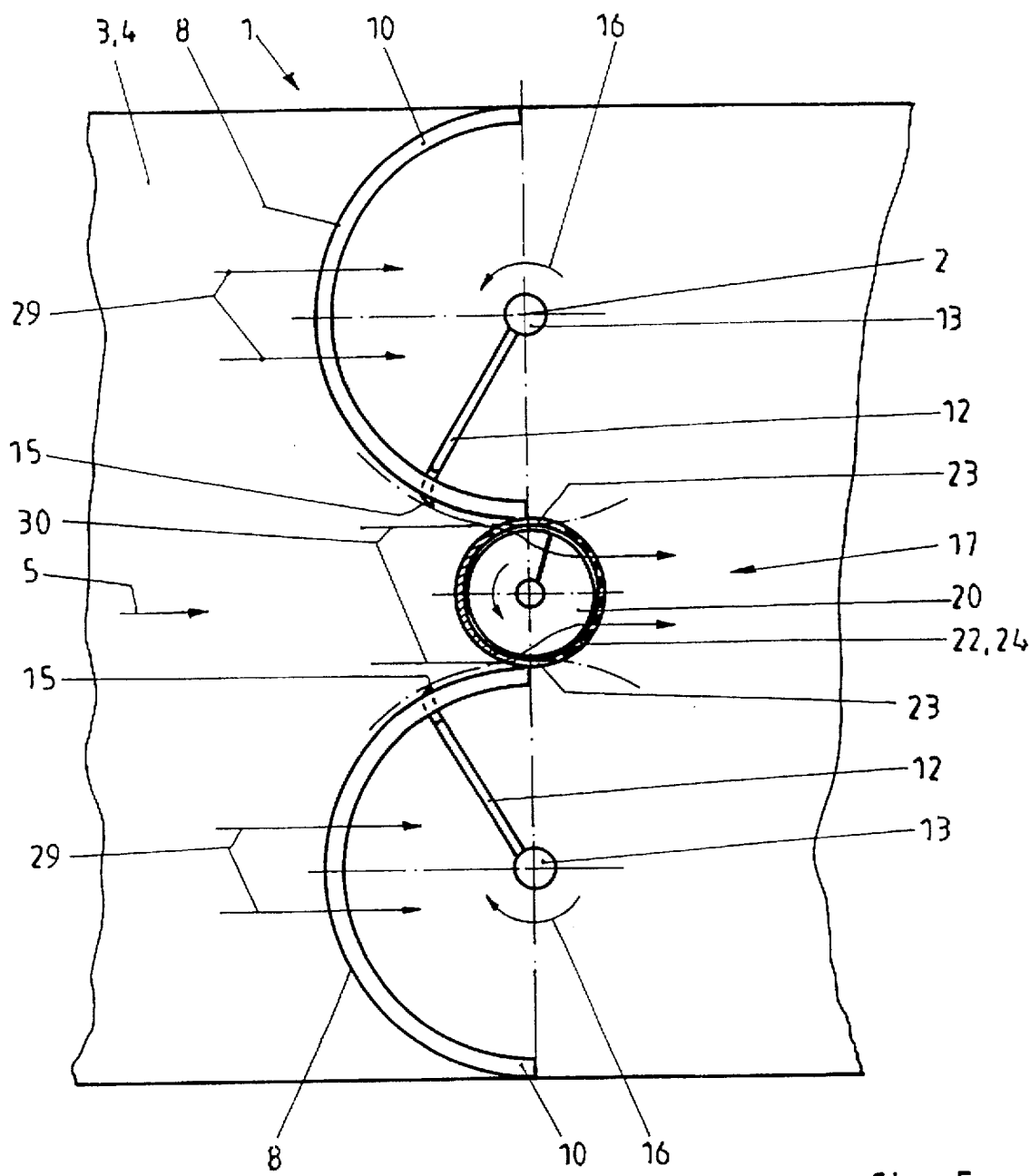

It is possible also to position two units for depositing material on its grating surfaces 8 in conjunction with a single conveying device 17, as illustrated in FIGS. 4 and 5. The conveying device 17 is located in the middle and the removing beams 12 of the two units are rotated in opposite directions so that both units gather and convey the material from the grating surfaces in the direction to the conveying device 17. In this case two openings 23 or a common opening are provided in the housing 22. Here also the flow of the liquid in the channel 3 according arrow 30 is used in order to convey the material into the conveying device 17 so that the screw 20 can act upon the material.

Figure 6:
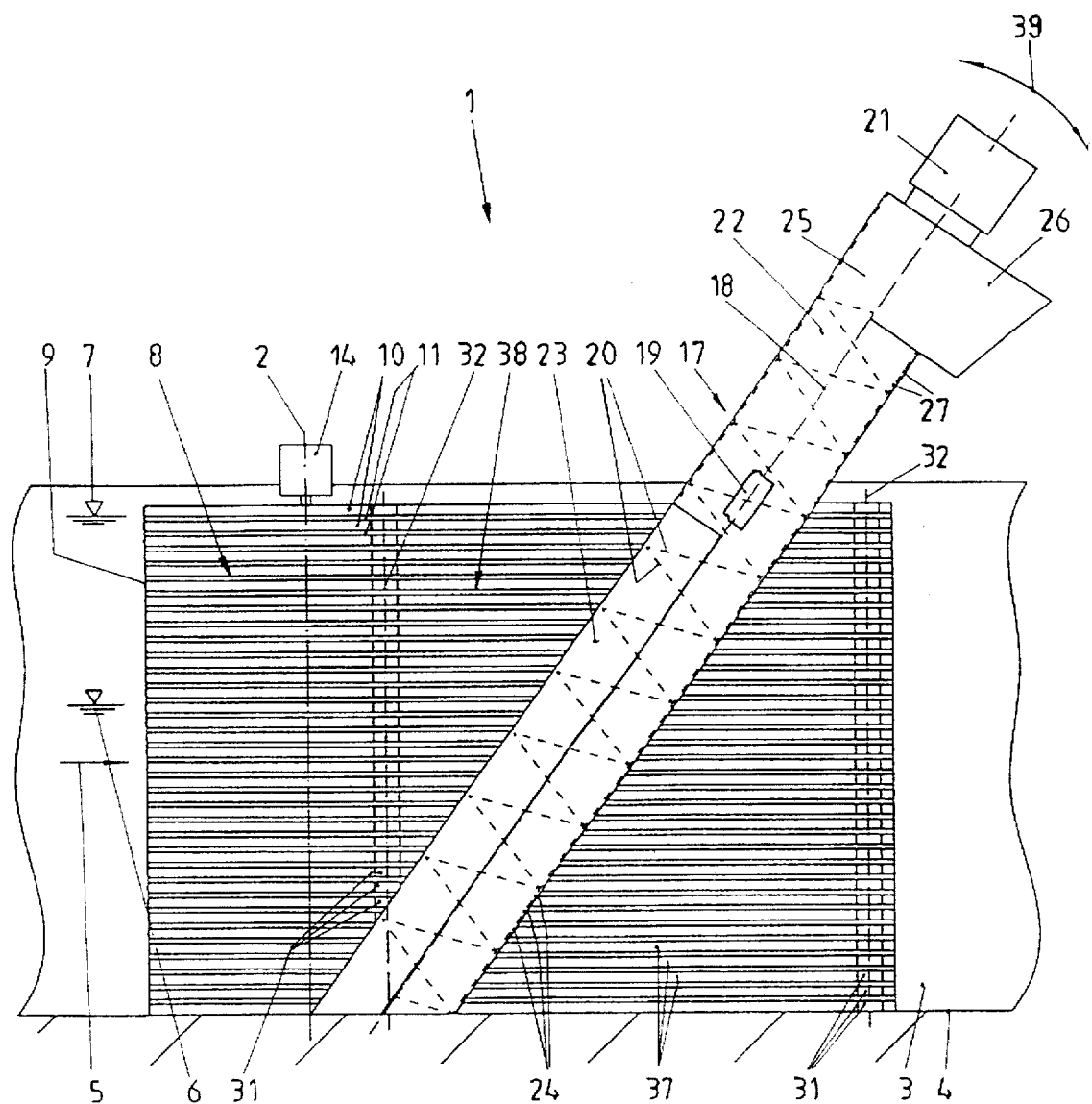
Figure 7:
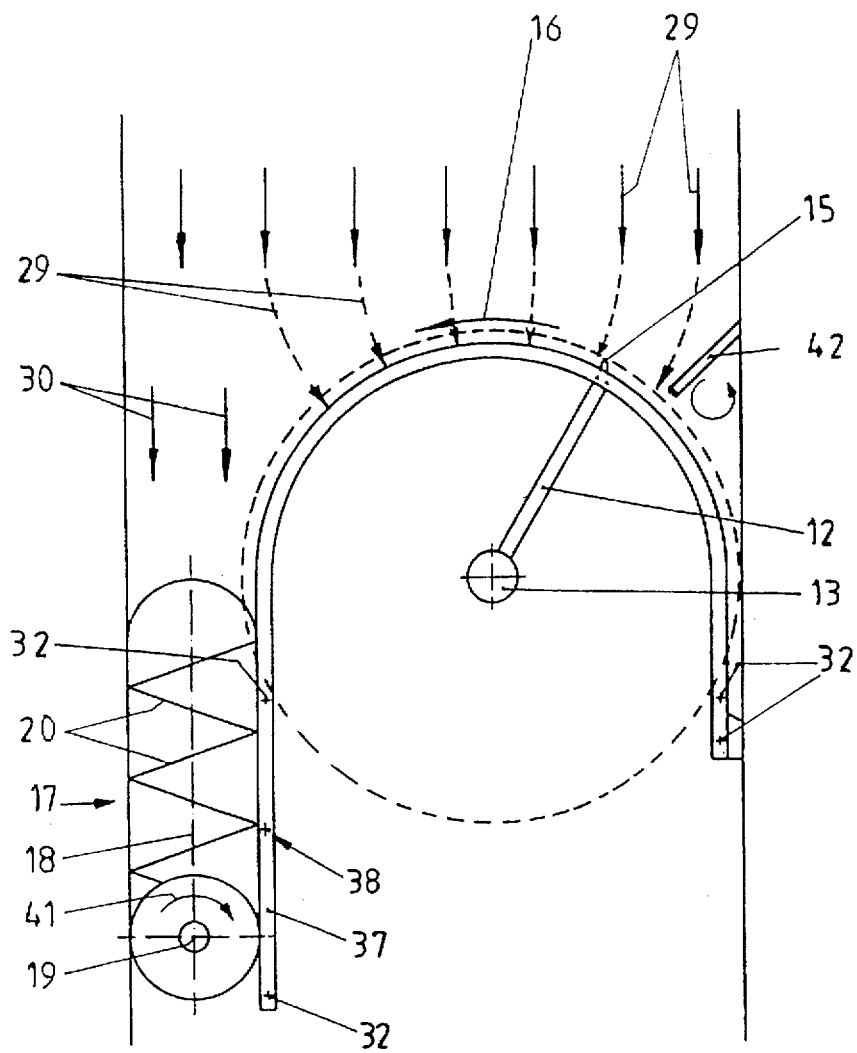

In FIGS. 6 and 7 a further embodiment of the device is illustrated having special advantages. The axis 2 of the grating surface 8 in form of the semicylinder is positioned vertically in the channel 3. The semicircular grating bars 10 at one end are provided with long extending prolongations 37 so that the shape of a walking stick results. The prolongations 37 extend in the flow direction 5 in the channel 3. The prolongations 37 form a connection wall 38 having a rectangular area. However, important for the construction is the triangular part only which is located above the conveying device 17 and forms a tangential transition between the semicircular grating bars 10 and the housing 22 of the conveying device 17. The connection wall 38 thus generated by the prolongations 37 is a plane surface which may be designed open having slots, as illustrated in FIG. 6, but which may be designed closed also for example by a sheet steel. It is due to the connection wall 38 that on the one hand the unit having the grating surface 8 and on the other hand the conveying device 17 may be designed as separate units and may be positioned separately in the channel 3. Thus, the axis 2 of the grating surface 8 is positioned vertically, while the axis 18 of the conveying device 17 is positioned slanting downwardly in different possible angles. This possibility is illustrated by the double headed arrow 39 in FIG. 6. Axles 32 are positioned in the region of the prolongations 37, while the semicircular grating bars 10 are free from axles 32. Here the prolongations 37 have openings through which the axles 32 extend. The distance of the prolongations and thus the width of the slots 11 between the grating bars 10 is determined by the height of the distance pieces 31. On the other end of the grating bars 10 prolongations 40 may be located which are designed shorter than the prolongations 37. Here also axles 32 are arranged in the area not covered from the revolving removing elements 15. Thus, the semicircular grating bars 10 are positioned and held with precise distance to each other, especially at the line at which the removing elements 15 enter the slots 11 so that the entry is possible without difficulty. During revolution of the removing elements 15 a self-adaptation occurs within the flexibility of the grating bars 12. The removing elements 15 gather and push the material on the convex outside of the grating surface 8. At the line at which the free ends of the removing elements 15 withdraw from the semicircular grating bars 12 the material comes free from the removing elements 15 and is conveyed further by the flow of the liquid and thus guided into the conveying device 17. The material is collected on the common line between the connection wall 38 and the housing 22 of the conveying device 17. The screw 20 is driven according arrow 41 in a direction in order to guide the material into the conveying device 17. FIG. 7 illustrates the flow of the liquid in the channel 3. In the region of the grating bars 10 the flow is directed perpendicular to the convex surface in the direction of arrows 29 through the grating surface. On the sidewalls of the channel inserts 42 guiding the flow of the liquid may be located as illustrated for one of the sidewalls. Thus, the flow direction of the liquid is influenced and a depositing of material is avoided in the corners.

Figure 8:
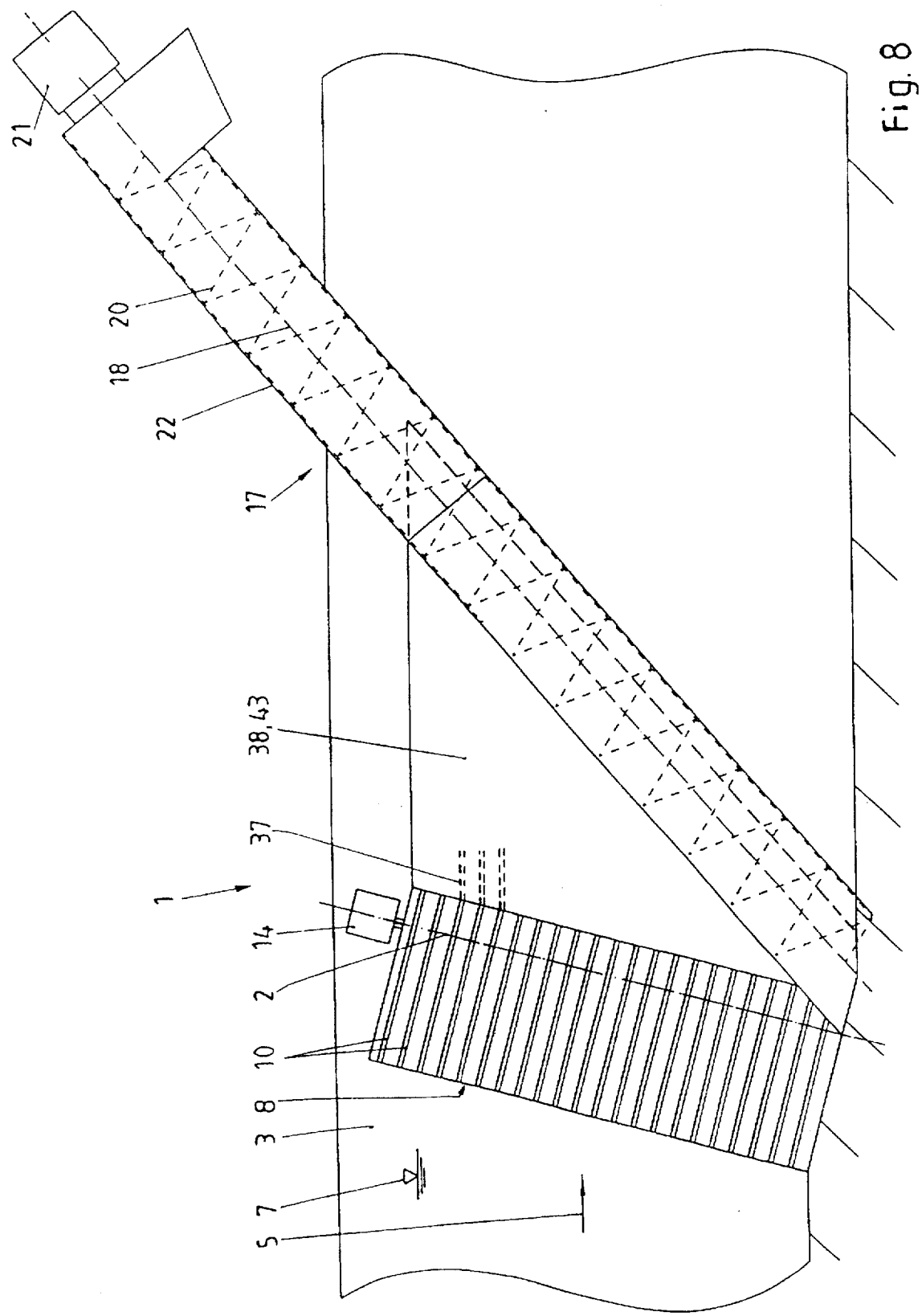

Comparing FIGS. 6 and 8 it is evident to use distance pieces 31 of different height. This is possible in all embodiments. Thus, screening devices having different width of their slots 11 may be realised, for example fine raking devices or raking devices with larger width of their slots. However, it is possible also to divide the grating surface of one raking device in different parts and to use distance pieces 31 of different width in the parts (FIG. 9) to generate an emergency overflow for example.

In the embodiment illustrated in FIG. 8 the axis 2 of the grating surface 8 is positioned slanting downwardly. The prolongations 37 of the grating bars 10 shown in dotted lines are formed with a buckle. The connection wall 38 is covered by a sheet steel 43 having a triangular shape. Thus, the connection wall 38 is closed.

Figure 9:
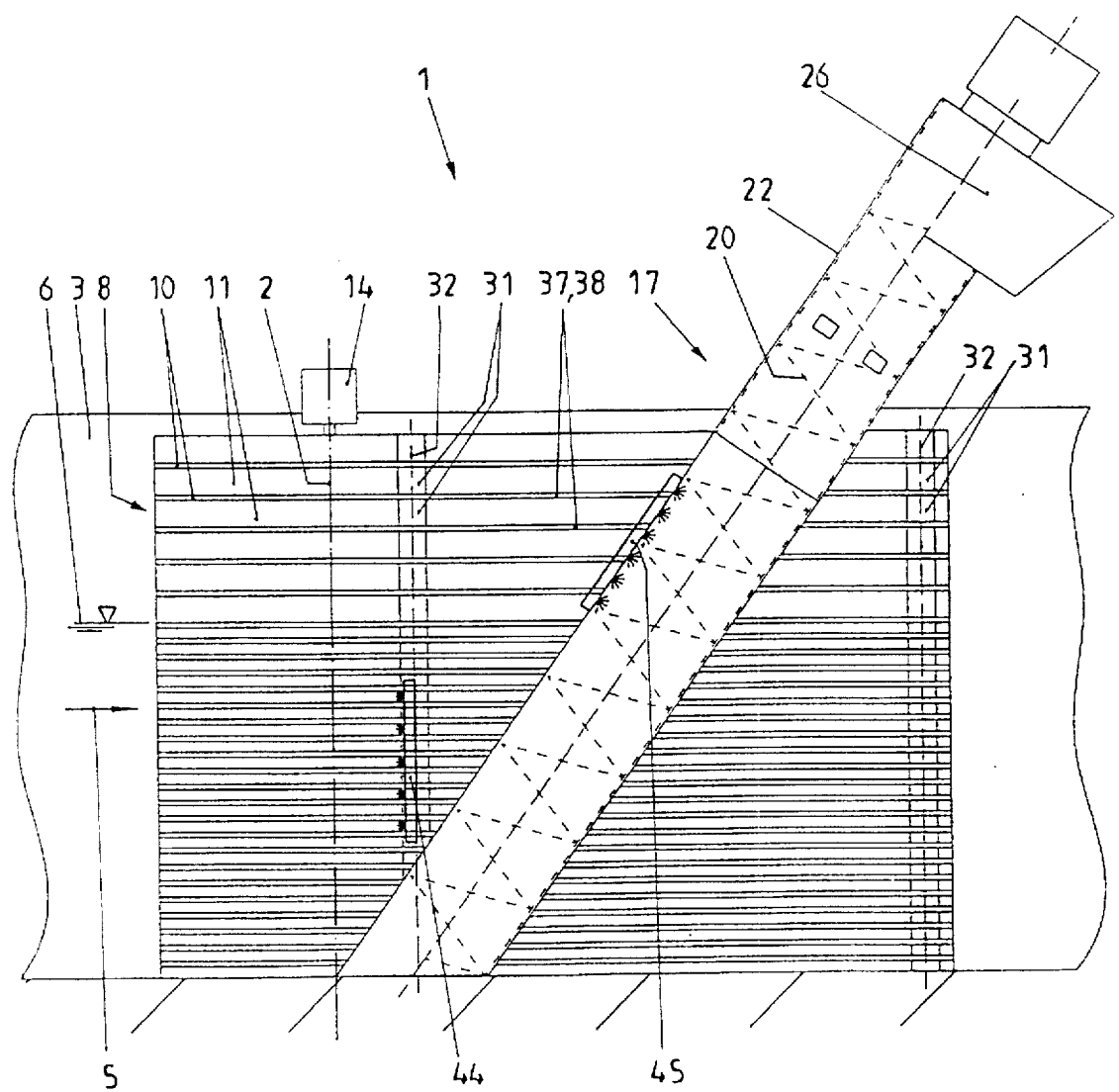

The embodiment of FIG. 9 is similar to the embodiment of FIG. 6. In the upper region of the grating surface 8 an emergency overflow is provided. The normal maximum liquid level 6 is shown. To facilitate loosening of the material from the prolongations 37 the connection wall 38 a spraying bar 44 may be located under the liquid level to generate a flow through the slots between the prolongations 37 in the direction towards the conveying device 17. In the region above the normal maximum liquid level 6 a nozzle bar 45 may be arranged serving to spray service water to create a washing effect for the material in the conveying device 17. It is evident that the housing 22 is designed open in this region or the opening 23 extends into this area.

While the foregoing specification and drawings disclose preferred embodiments of the invention, it will be understood by those skilled in the art that variations and modifications thereof can be made without departing from the spirit and scope of the invention, as set forth in the following claims.

I claim:

1. A device for removing material screened or filtered out of a liquid flowing in a channel (3), especially in waste water treatment plants, comprising an unpowered cylindrical grating surface (8) being immersed partly in the liquid and being formed by a plurality of substantially semicircular grating bars (10) located with distance to each other, a removing beam (12) rotatably driven about the axis (2) of the grating surface (8) and having removing elements (15) extending between the grating bars (10) from the inside of the cylinder to the outside, and a conveying device (17) for the material which is positioned with respect to the grating surface (8) and leads to a point outside the liquid in the channel (3), the device having a tube-like housing (22) with an opening (23) for the entry of the material and a driven screw (20) inside the housing (22), wherein the unpowered at least about semicircular formed grating bars (10) of the grating surface (8) are positioned with their convex surfaces facing the flow direction (5) of the liquid in the channel (3) so that the material is deposited on the outside of the grating surface (8), the removing elements (15) on the removing beam (12) extend from the inside of the cylinder to the outside between the grating bars (10) in the direction opposite to the flow of the liquid according arrows (29) through the slots (11) between the grating bars (10), the part of the cylinder not covered by the semicircular grating bars (10) is designed open, and the conveying device (17) is positioned with its axis (18) slanting downwardly to the bottom of the channel (3).

2. The device of claim 1, wherein a connection wall (38) is provided between the semicircular grating bars (10) and the opening (23) of the housing (22) of the conveying device (17), and the cylindrical grating surface (8) with the axis (2) and the conveying device (17) with the axis (18) are designed to be positioned in different angles with respect to the channel (3).

3. The device of claim 1, wherein the housing (22) of the conveying device (17) is provided with holes (24) distributed over the axial length of the opening (23).

4. The device of claim 1, wherein the semicircular grating bars (10) of the grating surface (8) with the use of distance pieces (31) are mounted and held replaceably in spaced relationship on axles (32).

5. The device of claim 4, wherein distance pieces (31) of different height are provided in order to vary the width of the slots (11) between the grating bars (10).

6. The device of claim 1, wherein the housing (22) of the conveying device (17) is designed in form of a sieve or a slitted wall extending at least over the axial length of the opening (23) in the housing (22).

7. The device of claim 2, wherein the connection wall (38) has a closed plane surface and is positioned in the channel (3) parallel to the flow direction (5).

8. The device of claim 1, wherein the removing beam (12) with its removing elements (15) is composed from elements (34, 35, 36) which can simply be replaced or completed.

9. The device of claim 1, wherein the conveying device (17) comprised a pressing zone (25) for the material, the pressing zone (25) being arranged upstream to a chute (26).

10. The device of claim 1, wherein the removing beam (12) on the one hand and the conveying device (17) on the other hand both are equipped with separate drives (14, 21).

* * * * *